March 7, 1961   P. H. DIXON   2,973,848
TORQUE RESPONSIVE CLUTCH
Filed March 2, 1959   4 Sheets-Sheet 1
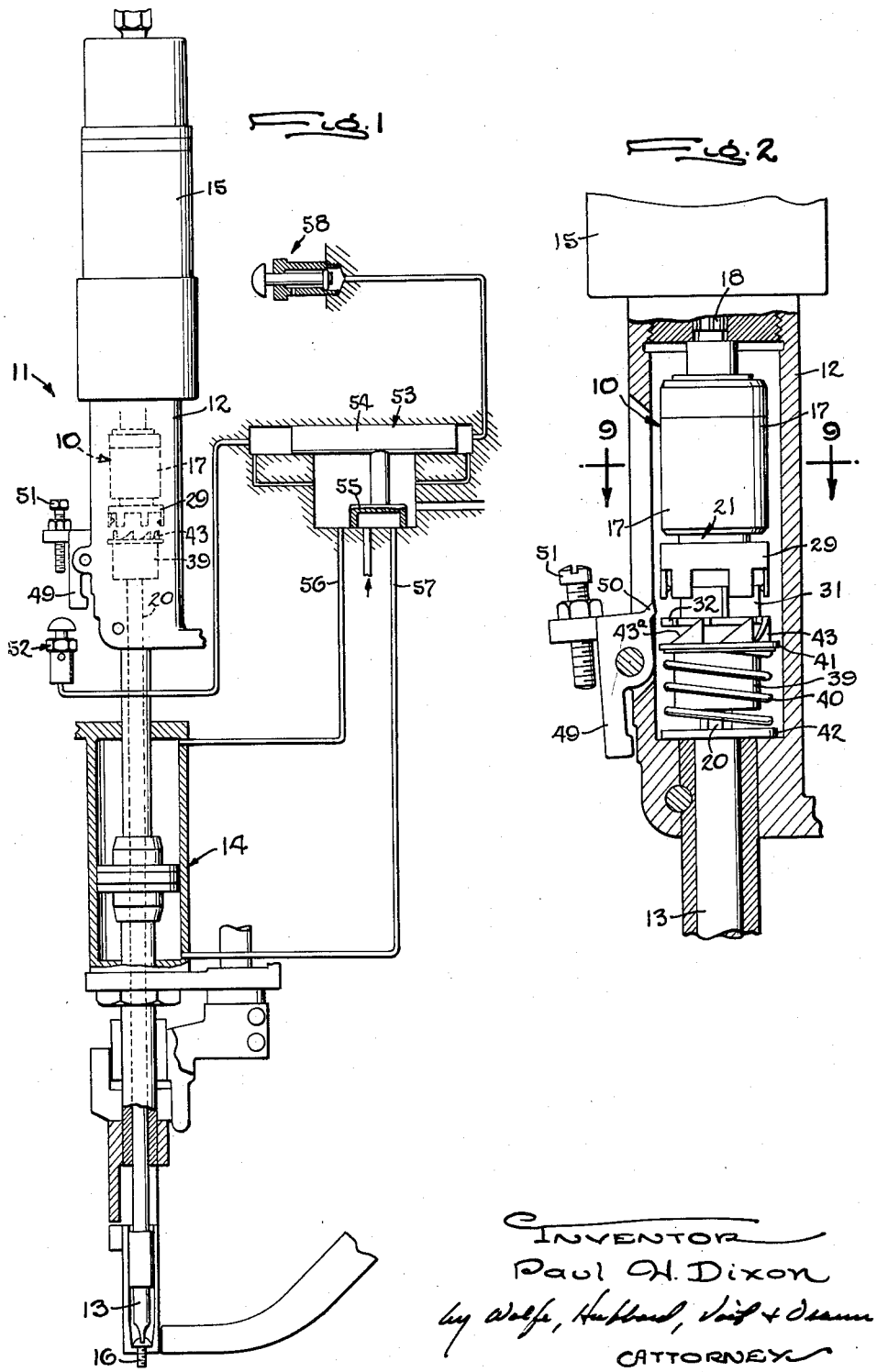
INVENTOR
Paul H. Dixon
by Wolfe, Hubbard, Voit & Osann
ATTORNEY

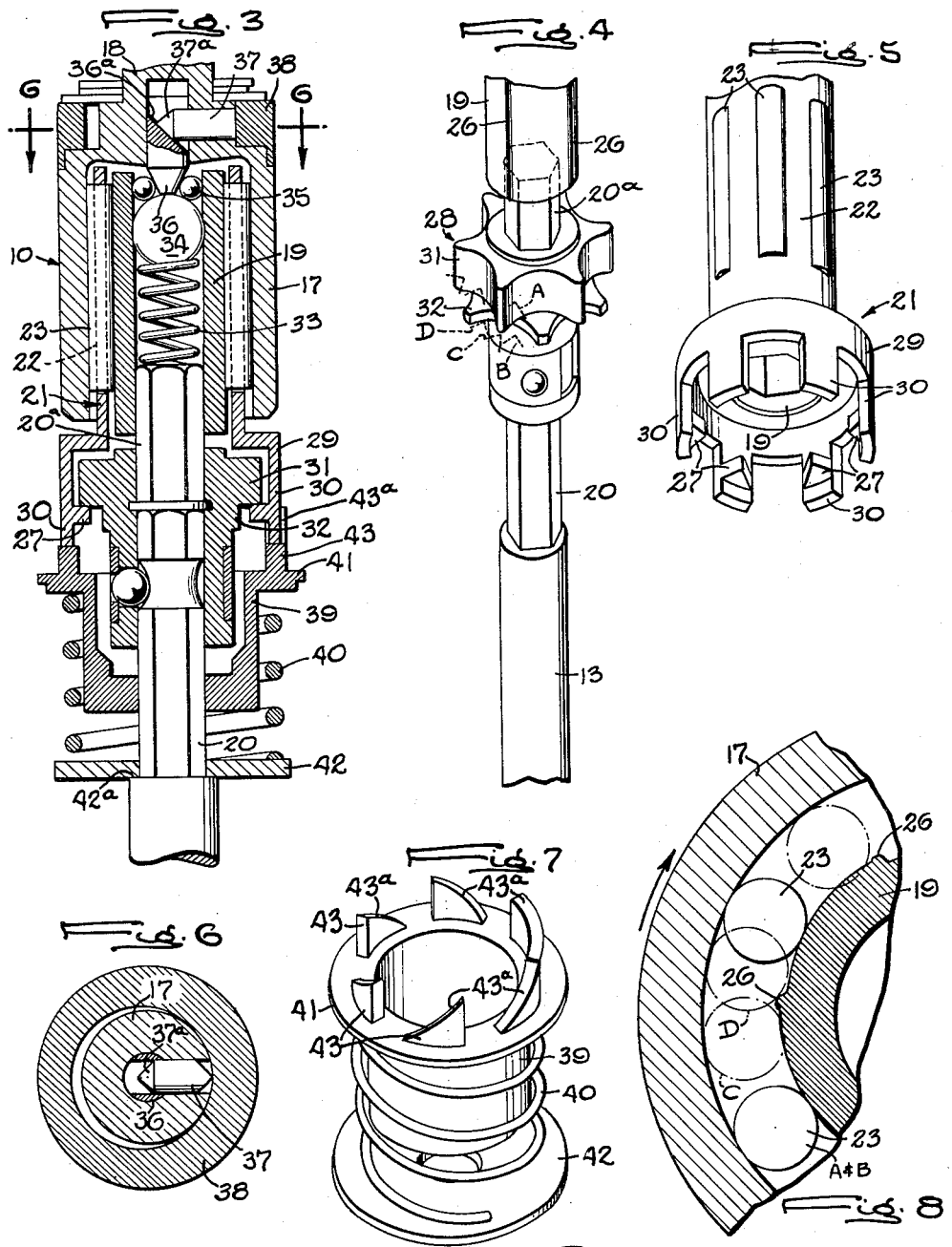

March 7, 1961 P. H. DIXON 2,973,848
TORQUE RESPONSIVE CLUTCH
Filed March 2, 1959 4 Sheets-Sheet 3
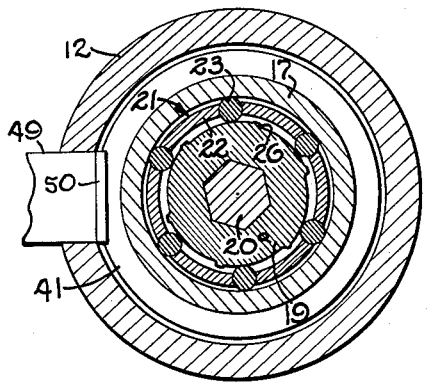
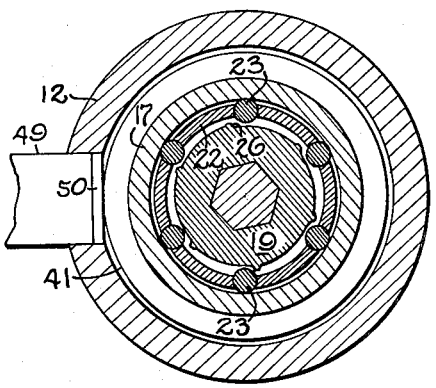
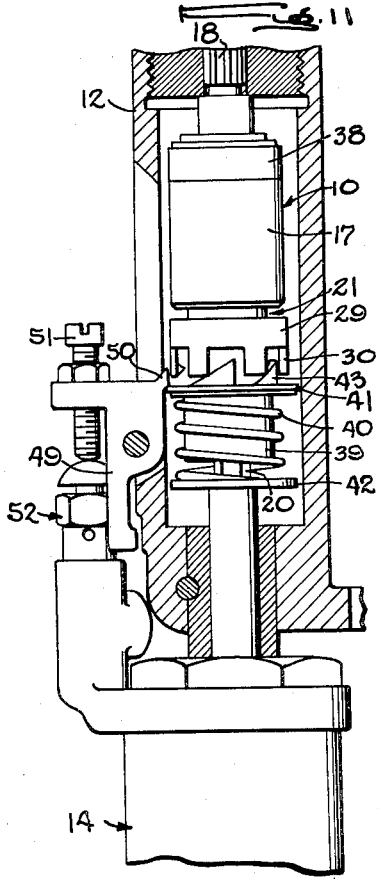
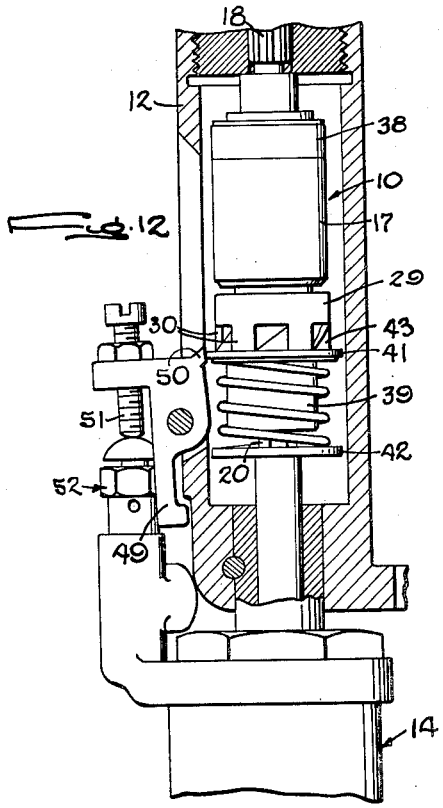
INVENTOR
Paul H. Dixon
by Wolfe, Hubbard, Voit & Osann
ATTORNEYS March 7, 1961 P. H. DIXON 2,973,848
TORQUE RESPONSIVE CLUTCH
Filed March 2, 1959 4 Sheets-Sheet 4
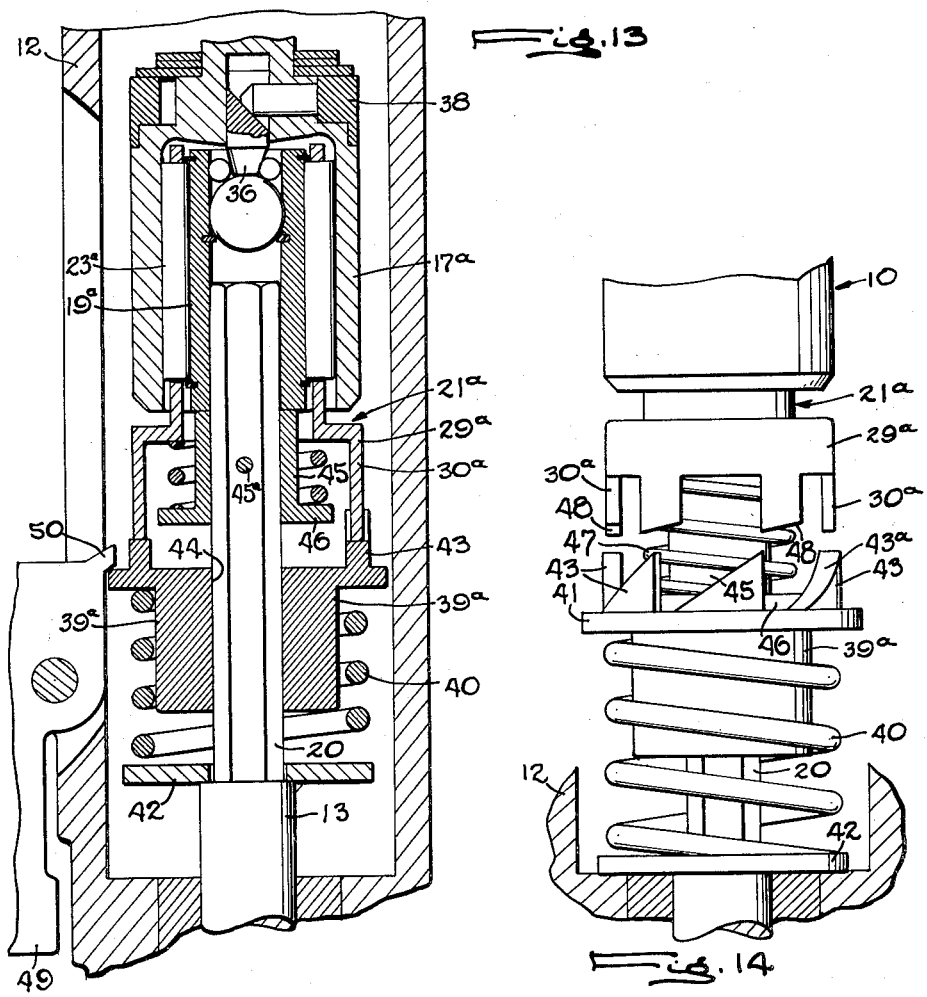
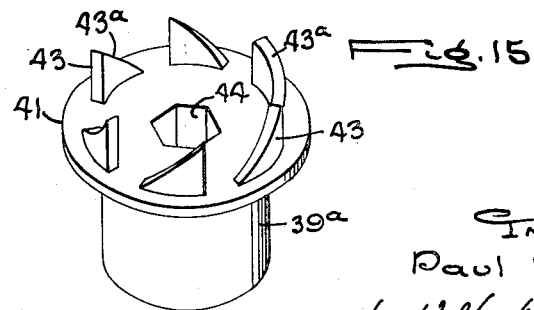
INVENTOR
Paul H. Dixon
by Wolfe, Hubbard, Voit & Osann
ATTORNEY

United States Patent Office 2,973,848
Patented Mar. 7, 1961

2,973,848

TORQUE RESPONSIVE CLUTCH

Paul H. Dixon, % Dixon Automatic Tool, Inc., 2300 23rd Ave., Rockford, Ill.

Filed Mar. 2, 1959, Ser. No. 796,415

7 Claims. (Cl. 192—56)

This invention relates to a torque responsive clutch, that is, one which disengages upon application of a predetermined torque, and more particularly to a clutch in which rollers mounted on a cage are disposed between the concentric driving and driven members of the clutch and become crowded between the opposed surfaces of the members to engage the clutch. Such crowding is obtained by forming ridges on the surface of the driven member and by moving rollers onto these ridges. Upon the application of a predetermined torque, the rollers pass over the ridges thereby disengaging the clutch.

The general object of the invention is to provide a clutch of the above character in which the rollers are moved positively into the crowded position on the ridges rather than relying solely upon frictional drag between the rollers and the driving member to accomplish this.

A more detailed object is to form cams and followers on parts which rotate with the cage and the driven member respectively and which coact to turn the cage relative to the driven member and thereby move the rollers onto the ridges to engage the clutch.

Another object is to arrange the cams and followers to interlock when the clutch becomes disengaged upon the application of a predetermined torque whereby the cams and followers then serve to hold the clutch in the released condition.

Other objects and advantages of the invention will become apparent from the following detailed description taken in connection with the accompanying drawings, in which Figure 1 is a side elevation of the automatic assembling device having a clutch embodying the novel features of the present invention and with parts broken away and shown in section. Also shown is the pneumatic circuit employed for controlling the operation of the actuator.

Fig. 2 is a fragmentary view of the clutch showing the parts in the disengaged position.

Fig. 3 is a side elevation showing the clutch and follow-up members in cross section.

Fig. 4 is a fragmentary perspective view of the clutch output element and the upper end of the tool rod showing the escapement means.

Fig. 5 is a perspective view of the intermediate clutch member.

Fig. 6 is a sectional view taken along line 6—6 in Fig. 3.

Fig. 7 is a perspective view of the follow-up member which coacts with the clutch.

Fig. 8 is a diagram showing the positions, with respect to the driven member, occupied by a roller during a typical torque releasing cycle.

Fig. 9 is a sectional view taken along line 9—9 in Fig. 2 and showing the clutch elements in the driving condition.

Fig. 10 is a sectional view similar to Fig. 9 but showing the clutch elements in the released position.

Fig. 11 is a fragmentary view of the clutch similar to Fig. 1 but showing the clutch elements in the driving condition.

Fig. 12 is a fragmentary view of the clutch similar to Figs. 2 and 11 but showing the clutch elements in the position occupied immediately after "torque out."

Fig. 13 is a side elevation of a modified form of the invention showing the clutch and follow-up members in cross section.

Fig. 14 is a fragmentary side view showing the clutch elements in the modified form of the invention.

Fig. 15 is a perspective view of the follow-up member used in the modified form of the invention.

The present invention is shown in the drawings for purposes of illustration as embodied in a torque responsive clutch 10 for use in an automatic assembling machine 11 such as a screw driver or the like as described in my copending application Serial No. 706,982, filed January 3, 1958. The clutch 10 is disposed within a housing 12 and mounted to rotate relative to the housing. A tool 13 extends axially from the driven member of the clutch and is equipped with a pneumatic actuator 14 which moves the tool into engagement with the work and automatically retracts the tool when a predetermined amount of torque is transmitted. A motor 15 mounted coaxially with the clutch 10 on one end of the clutch housing supplies the power to drive the mechanism. In operation, the screws 16 are automatically fed to the machine and the tool rotates and reciprocates toward and away from the workpiece to drive successive screws in the workpieces.

The clutch itself consists of a tubular driving member 17 (Fig. 3) having one end closed and adapted to be connected to a motor 15 through the medium of a splined post 18 projecting upwardly from the driving member. A cylindrical driven member 19 is disposed within the driving member 17 and journaled to rotate coaxially therewith. One end of the driven member has a squared bore which receives the squared member 20a coupling a tool shaft 20 to the driven member so as to prevent relative rotation between these parts.

Power is transmitted between the driving and driven members by means of an intermediate member 21 having a cage portion 22 interposed between the driving and driven members of the clutch and held in position by a retaining ring 25. Journaled in the cage portion 22 are a plurality of rollers 23 which roll on both the bore of the outer member and the periphery of the inner member and coact therewith to drive the latter.

To enable the rotation of the driving member 17 to be transmitted to the driven member 19 through the medium of the rollers 23, longitudinal ridges 26 (Figs. 9 and 10) are formed on the outer surface of the driven member. When the intermediate member 21 rotates relative to the driven member 19, the rollers 23 are crowded between the ridges and the bore of the driving member thus preventing relative rotation and locking the members of the clutch together. Upon reaching a predetermined torque between the members, the rollers are forced over the ridges 26 and into the recesses between the ridges whereby the driving member 17 can rotate relative to driven member 19 thus rendering the clutch 10 ineffective to transmit torque.

During certain portions of the cycle of the machine, it is desirable that the clutch remain in the released or "torque out" condition and, in order to achieve this, means are provided to prevent the intermediate member 21 from rotating relative to the driven member 19 whereby the rollers 23 are prevented from contacting the ridges 26. In the present embodiment, this means comprises a series of radially projecting dogs 27 formed on a cup shaped portion 29 of the intermediate member to coact with a star wheel escapement means 28 fixed to the tool shaft 20. The cup-shaped portion 29 projects longitudinally from the cage portion 22 and is divided into a number of segments 30 with one dog 27 formed on each segment. Two star wheels 31 and 32 are used in the present embodiment and are mounted on the tool shaft 20 so that their teeth are offset from each other as shown in Fig. 4. The wheels 31 and 32 move bodily with the tool shaft 20 so that either one of the two may be brought alternately into the path of movement of the dogs 27 formed on the intermediate member 21 to establish the two conditions of operation of the clutch, released and driving.

In the released position, the dogs 27 are in contact with the teeth of the upper star wheel 31 which locks the cage 22 in the released position wherein the rollers 23 are disengaged and disposed in the recess between the ridges 26. The tool shaft 20 and thus the escapement means 28 is urged into this released position by a spring 33 acting between the driven member 19 and the tool shaft. Thus, when the tool 17 is withdrawn from the work, the tool shaft 20 is forced downwardly by the spring 33 thereby moving the upper star wheel 31 into the path of the dogs. When the tool is pressed against the work, the tool shaft is moved upwardly against the force of the spring 33 thus moving the upper star wheel 31 out of engagement with the dogs and allowing relative rotation between the intermediate member and the driven member which brings the rollers 23 into the crowded position and engages the clutch.

When the upper star wheel 31 is shifted upwardly permitting rotation of the intermediate member, the lower star wheel 32 is brought into the path of the dogs 27. In the engaged position of the clutch, the dogs are disposed between the teeth of the star. When "torque out" occurs, the cage portion 22 rotates relative to the driven member 19 until the dogs 27 engage the teeth of the lower star wheel 32 which holds the rollers 23 in a released position. When the tool is withdrawn from the work, the spring moves the tool shaft downward and once more brings the upper star wheel into the path of the dogs so that the clutch is released until another cycle is initiated.

In understanding the operation of the clutch as thus far described, it will be helpful to refer to the lettered dog positions shown in Fig. 4 and the correspondingly numbered roller positions shown in Fig. 8. It will be understood that the dogs and rollers all act in unison; however, to simplify matters only one of the dogs 27 and one of the rollers 23 have been selected as representative. As a starting condition, it will be assumed that the tool has been withdrawn from the work following a normal "torque out". Under such conditions the tool shaft 20 will be in the lowered position with the rollers locked out by reason of engagement of the dog indicated at position A against one of the teeth of the upper star wheel 31. When the tool is advanced into contact with the work, the force of reaction causes the tool rod to move up against the force of the spring 33 thereby moving the first star wheel 31 to an out-of-the-way position and moving the second star wheel 32 into the plane of the dog. At this point, the dog is free to rotate through a small angle, i.e., from position B, which is directly below position A, to position C. This moves the roller into a crowding position and clutching occurs. Upon exceeding a predetermined torque, the roller is forced over the adjacent ridge on the cam with the result that the dog on the intermediate member 21 rotates an additional amount namely, from position C to position D. In position D the roller (Fig. 8) is free and the clutch is disengaged. Subsequent retraction of the tool from the workpiece enables the tool rod 20 to again move downwardly under the urging of the spring 33 which brings the star wheel 31 back into the path of movement of the dog. It will be apparent from Figs. 4 and 8 that the final condition corresponds exactly to that in which the cycle started, except that the escapement teeth have been advanced one step.

In order to adjust the amount of torque at which "torque out" will occur, the clearance or radial spacing between the input and output members 17 and 19 is increased or decreased selectively. This is accomplished by machining the members so that their opposed surfaces are conically tapered and by adjusting their endwise positions relative to one another. This change in endwise position is brought about by camming the driven member 19 downwardly with respect to the driving member. The cam, in the present instance, comprises a pin 36 (Fig. 3) mounted to slide axially in a bore in the driving member 17 and having an inclined cam surface 36ª formed on the upper end. A thrust member 37 is mounted to slide transversely relative to the pin 36 and has a tapered end 37ª which engages the cam surface 36ª and coacts therewith to force the pin 36 downwardly toward the driven member 19 of the clutch. The radial position of the thrust member 37 is controlled by an adjustment ring 38 mounted to turn on the driven member and having an eccentric bore which engages the outer end of the thrust member 37. The lower end of the pin 36 engages a ball 34 forcibly pressed into the upper end of the driven member to serve as an abutment for the pin. The spring 33 acts on the driven member 19 through this ball and serves the additional function of holding the pin 36 against the member 37. To insure that the pin 36 maintains the proper alignment in relation to the ball, a plurality of smaller balls 35 surround the ball 34 and engage the end of the pin preventing transverse movement of the pin.

It will be apparent that since the rollers 23 are restrained against endwise movement by the cage 22, their position remains constant. Hence, moving the cam 36 endwise in one direction depending upon the direction of taper, results in an increased effective clearance for the rollers 23 so that they will be relatively free to roll over the ridges provided on the driven member, thereby to produce a low torque setting. Conversely, a high torque setting may be achieved by moving the cam in the opposite direction, thereby decreasing the roller clearance and requiring considerable force to be applied before the device will "torque out."

Frictional drag between the driving member and the rollers of the immediate member is used to enable the clutch to move between the engaged and disengaged positions. There are times, however, when this drag is not sufficient to engage the clutch and the present invention, therefore, contemplates the provision of a positive means for rotating the cage and thereby bringing the rollers into the crowded position. This means includes a cup-shaped follow-up member 39 (Fig. 2) slidably mounted on the tool shaft 20 and urged upwardly into engagement with the segments 30 on the cup-shaped portion 29 by a spring 40 acting between the tool shaft and the member. The member 39 coacts with the segments to rotate the rollers 23 relative to the driven member 19 and into the crowded position against the ridges 26. A radial flange 41 formed on the follow-up member provides a surface for one end of the spring 40 to act against and a washer 42 mounted on a shoulder 42ª on the tool shaft provides the opposing surface.

To convert the end thrust produced by the spring 40 acting against the follow-up member 39 into rotation of the intermediate member 21, upstanding lugs 43 having helical cam surfaces 43ª formed thereon are provided on the upper end of the follow-up member. These surfaces act against the segments 30 on the cup-shaped portion 29 of the intermediate member and the upward movement causes the segments 30 to move along the cam surfaces 43ª and thereby rotate the rollers 23 into the crowded position.

Under driving conditions, the entire unit rotates and is maintained in the phase position shown in Fig. 11 since the rollers are crowded against the ridges thus locking the various parts together. It will be noted that, in this position, the segments 30 formed on the intermediate member ride between the ends of the helical cam surfaces 43 and the coiled spring 40 is compressed. When "torque out" occurs the intermediate member 21 becomes free to rotate relative to the driven member 19 and thus the axial force exerted by the spring 40 causes the segments 30 to be cammed along the helical surfaces 43 enabling the cams to snap into place between the segments. When the tool is withdrawn from the work, the tool shaft moves downwardly thus separating the cams from the segments as shown in Fig. 2.

As noted before, when the tool shaft 20 moves downwardly, the clutch is locked in the disengaged position by the dogs 27 and star wheels of the escapement means 28. As the tool 13 is lowered against the work, the escapement means is shifted upwardly and the intermediate member 21 is free to rotate relative to the driven member 19. The rotation of the driving member of the clutch causes the intermediate member to "drift" or rotate relative to the driven member due to the friction between the driving member and the rollers 23. With the present invention, however, the drift is not relied on to engage the clutch but rather merely to move the intermediate member relative to the driven member sufficiently to place the entire segment over the inclined cam surface so that the segment is cammed along the surface as the tool is pressed against the work. When the latter takes place, the clutch is positively moved into the driving position.

The relative rotation of the intermediate member with respect to the driven member which occurs at "torque out" permits axial movement of the follow-up member which, in turn, triggers the retracting movement of the tool from the work. To this end, a bell crank lever 49 (Figs. 11 and 12) is pivoted on the clutch housing 12 and has a laterally extending ear 50 which extends into the path of axial movement of the follow-up member 39. Mounted on an outwardly extending arm of the bell crank lever 49 is a set screw 51 which bears against the actuator on a poppet valve 52. Gravity acts to maintain the bell crank lever biased on a counterclockwise direction.

Under normal driving conditions, the entire clutch assembly including the follow-up member 39 rotates. The follow-up member is maintained in the phase position shown in Fig. 11 by the fact that the intermediate member 21 is locked by the rollers 23 in its running phase position with respect to the driven member 19, and hence with respect to the tool shaft 20. When "torque out" occurs, the phase position of the intermediate member with respect to the tool shaft changes and the resulting rotation of the segments 30 permits the helical surfaces 43 to advance upwardly. This is accompanied by upward movement of the follow-up member 39 which, in moving upwardly, engage the ear 50 formed on the bell crank 49. This causes the bell crank to be rotated in a counterclockwise direction, depressing the poppet valve 52. The latter causes a lower chamber of the actuator 14 to be pressurized thereby effecting immediate upward movement of a piston 14ª, disposed within the chamber, and the tool shaft.

The pneumatic system employed for retracting the tool assembly upwardly when "torque out" occurs is shown in Fig. 1. Here it will be noted that the poppet valve 52 is connected to a pneumatic control valve 53 having a plunger 54 and a slide 55 which is capable of feeding air alternatively to the conduits 56 and 57 of the actuator 14. One side of the control valve 53 may be vented by the poppet valve 52 whereby the plunger 54 and the attached slide 55 are shifted to the vented end by the air pressure in the cylinder. In this position, the control valve supplies air to the lower end of the actuator 14 through conduit 57 and the tool is withdrawn from the work.

A second poppet valve 58, manually operated if desired, is connected to the opposite end of the control valve 53 and is operable to vent this end of the valve causing the plunger 54 and slide 55 to shift whereby the conduit 57 communicating with the lower end of the actuator is vented and air is supplied to the upper end through the conduit 56 attached thereto. In Fig. 1 the control valve 53 is shown in the latter condition, that is the condition which exists as the tool is being lowered toward the work. Actuation of valve 58 has resulted in the opening of conduit 56 whereby air is being supplied to the upper end of the actuator.

A modification of the invention is depicted in Figs. 13–15 wherein the escapement means is eliminated and the upstanding cam surfaces formed on the follow-up member not only bring the clutch into engagement but also are utilized to control the movements of the intermediate member. In this embodiment, the driving, driven and intermediate members are as described above. The adjustment means by which the amount of torque to be transmitted by the members is controlled is also the same.

The modification departs from the former construction in that the follow-up member 39ª is not cup-shaped but rather in the form of a solid cylinder with a squared bore 44 which receives the tool shaft 20 so as to prevent relative rotation between the two. A peripheral flange, having a plurality of upstanding lugs 43 formed thereon and shaped to comprise the helical cam surfaces 43ª is provided on the upper side of the member so as to engage the segments 30 of the cup portion of the intermediate member.

A cylindrical member 45 is mounted on the tool shaft 20 and held in position by a pin 45ª extending through the member and the shaft. A flange 46 formed on one end of the member abuts the top of the follow-up member 39ª. The tool shaft 20 is forced downwardly, upon retraction of the tool 13 from the workpiece, by a compression spring 47 mounted on the cylindrical member to act between the cup-shaped portion 29ª of the intermediate member 21 and the flange 46. The cycle of operation of both embodiments are the same, having engaged and released positions and moving from the former to the latter upon reaching a predetermined torque.

In accordance with the aspect of the invention as incorporated in this modification, the escapement means is eliminated and the clutch is held in the release position after "torque out" by the coaction between the follow-up member 39ª and the cup-shaped portion 29ª of the intermediate member 21ª. To this end the upstanding helical cam surfaces 43ª formed on the follow-up member are sized to interfit the longitudinally extending segments 30ª on the intermediate member. When the clutch is engaged, the segments ride intermediate the ends of the cam surfaces as in the other embodiment of the invention. When torque out occurs, the intermediate member, with the segments 30ª, rotates and permits the cam surfaces 43ª to move upwardly into a position between the segments whereby any further rotation of the intermediate member 21ª relative to the driven member 19ª is prevented. Since the intermediate member cannot rotate relative to the driven member, the rollers 23 cannot come into engagement with the ridges 26 formed on the driven member and, therefore, the clutch is ineffective to transmit torque. When the tool 13 is withdrawn from the work, the spring 47 forces the tool and the follow-up member 39ª downwardly whereby the helical surfaces 43ª are moved below the segments 30ª permitting the friction to rotate the intermediate member and move the rollers into position to transmit torque.

As in the other form of the invention, friction is not solely depended upon to cause the intermediate member to "drift" and move the rollers into the crowded position. Here also, end thrust on the tool moves the helical surfaces 43a into engagement with the segments 30a on the intermediate member. This cams the clutch into the engaged position and thus acts as a positive means to insure that the rollers 23a will move into the proper position to transmit torque.

In the present modification, the segments 30a, formed on the intermediate member 21a, have ends 48 inclined in the same direction as the helical surface 43a. It will be noted that with this construction, less "drift" is required before the helical surface will be operable to move the clutch into engagement since only the leading edge of the segment need be positioned above the cam surface.

It will be noted that with a device as described above rapid and efficient automatic assembly for threaded fasteners is made possible. Damage to the screws or the workpieces is prevented by the adjustable "torque out" feature of the clutch and, at the same time, the clutch is cammed positively into the engaged position. In addition, the means for camming the clutch also is effective to trigger a rapid tool retraction mechanism. Since the sequence of operation is controlled by mechanical means, it is not possible for the device to get "out of time" and, consequently, there is no necessity for making repeated sensitive adjustments. Once the device has been put into operation it can be expected to perform for long periods of time unattended and without care or attention.

The present application is a continuation-in-part of my co-pending application Serial No. 706,982, filed January 3, 1958.

I claim as my invention:

1. A torque responsive clutch having, in combination, a tubular member, a cylindrical member disposed coaxially with and inside of said tubular member, said members having opposed radially spaced surfaces, a cage disposed between said surfaces, rollers journaled on said cage to roll on both of said surfaces, means for connecting one of said members to a power actuator whereby said one member is turned about its own axis and constitutes the driving member of the clutch while the other member constitutes the driven member, a plurality of longitudinal ridges formed on and angularly spaced around the surface of said driven member whereby said rollers press between said ridges and the surface of said driving member to couple the two members and pass over the ridges upon the application of a predetermined torque to release the members, a part mounted to turn with said driven member and to move axially relative to said cage, segments formed on said cage to project longitudinally toward said part, a plurality of lugs formed on said part and projecting longitudinally toward said cage, coacting cam and follower surfaces formed on said segments and said lugs and operable when engaged to turn the cage and move said rollers in between said ridges and said surface on said driving member thereby positively to couple said two members, and a spring acting between said driven member and said part to urge said cam and follower surfaces into engagement.

2. A torque responsive clutch as defined in claim 1 in which said segments and said lugs are angularly spaced around the peripheral portions of said cage and said part respectively and in which the surfaces on said lugs are helical.

3. A torque responsive clutch having, in combination, a tubular member, a cylindrical member disposed coaxially with and inside of said tubular member, said members having opposed radially spaced surfaces, a cage disposed between said surfaces, rollers journaled on said cage to roll on both of said surfaces, means for connecting one of said members to a power actuator whereby said one member is turned about its own axis and constitutes the driving member of the clutch while the other member constitutes the driven member, a plurality of longitudinal ridges formed on and angularly spaced around the surface of said driven member whereby said rollers press between said ridges and the surface of said driving members to couple the two members and pass over the ridges upon the application of a predetermined torque to release the members, a part mounted to turn with said driven member and to move axially relative to said cage, coacting cam and follower surfaces formed on said cage and said part and operable when engaged to turn the cage and move said rollers in between said ridges and the surface on said driving member thereby positively to couple said two members, and mechanism selectively operable to move said cam and follower surfaces into engagement.

4. A torque responsive clutch having, in combination, a tubular member, a cylindrical member disposed coaxially with and inside of said tubular member, said members having opposed radially spaced surfaces, a cage disposed between said surfaces, rollers journaled on said cage to roll on both of said surfaces, means for connecting one of said members to a power actuator whereby said one member is turned about its own axis and constitutes the driving member while the other member constitutes the driven member, a plurality of longitudinal ridges formed on and angularly spaced around the surface of said driven member whereby said rollers press between said ridges and the surface of said driving member to couple the two members and thus engage the clutch and pass over the ridges upon the application of a predetremined torque to release the members and disengage the clutch, a part mounted to turn with said driven member and to move axially relative to said cage, a plurality of segments formed on said cage angularly spaced apart and projecting axially toward said part, a plurality of lugs formed on said part to project axially toward said cage and angularly spaced apart to fit between said segments, coacting cam and follower surfaces formed on said segments and said lugs and operable when engaged to turn said cage and couple said members and operable thereafter upon the application of a predetermined torque to turn said cage further thereby to enable the lugs to snap into the space between said segments and prevent relative rotation between said cage and said driven member with the clutch in a disengaged position, and means acting between said part and said driven member to urge said lugs into engagement with said segments.

5. A torque responsive clutch as defined in claim 4 in which the surfaces on said lugs extend helically around the axis of said members.

6. A torque responsive clutch as defined in claim 4 in which the surfaces on both said lugs and said segments extend helically in the same direction around the axis of said members.

7. A torque responsive clutch having, in combination, a tubular member, a cylindrical member disposed coaxially with and inside of said tubular member, said members having opposed radially spaced surfaces, a cage disposed between said surfaces, rollers journaled on said cage to roll on both of said surfaces, means for connecting one of said members to a power actuator whereby said one member is turned about its own axis and constitutes the driving member of the clutch while the other member constitutes the driven member, a plurality of longitudinal ridges formed on and angularly spaced around the surface of said driven member whereby said rollers press between said ridges and the surface of said driving member to couple the two members and thus engage the clutch and pass over the ridges upon the application of a predetermined torque to release the members and disengage the clutch, escapement means mounted for axial shifting between the engaged position and the disengaged position of the clutch and operable to hold the clutch alternately in either of the positions, a part mounted to turn with said driven member and to move axially relative to said cage, coacting cam and follower surfaces formed on said cage and said part and operable when engaged to turn the cage and move said rollers in between said ridges and the surface on said driving member thereby positively to couple said two members, and mechanism operable to move said part relative to said cage to bring said cam and follower surfaces into engagement.

References Cited in the file of this patent

UNITED STATES PATENTS

| | | |
|---|---|---|
| 394,367 | Johnson | Dec. 11, 1888 |
| 2,001,668 | Maier | May 14, 1935 |
| 2,498,856 | Iavelli | Feb. 28, 1950 |
| 2,771,804 | Better et al. | Nov. 27, 1956 |

FOREIGN PATENTS

| | | |
|---|---|---|
| 587,997 | Germany | Nov. 13, 1933 |
| 436,393 | Great Britain | Oct. 10, 1935 |
| 83,404 | Holland | Nov. 15, 1956 |